United States Patent
Kang

(10) Patent No.: US 7,493,216 B2
(45) Date of Patent: Feb. 17, 2009

(54) ACCESSORY-TYPE GPS RECEIVER

(75) Inventor: Do-Woo Kang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/919,660

(22) Filed: Aug. 16, 2004

(65) Prior Publication Data

US 2005/0043888 A1 Feb. 24, 2005

(30) Foreign Application Priority Data

Aug. 19, 2003 (KR) .................. 10-2003-0057324

(51) Int. Cl.
*H04B 1/18* (2006.01)
*H04B 1/06* (2006.01)
*H01R 24/00* (2006.01)

(52) U.S. Cl. ............... 701/213; 342/357.06; 342/357.1; 342/357.12; 340/426.19; 340/426.2; 340/531; 340/538.17; 340/539.1; 340/539.12; 340/539.13; 340/539.3; 340/568.2; 340/568.4; 455/334; 455/338; 455/343.1; 455/343.2; 455/343.5; 455/343.6; 455/345; 455/346; 439/626; 439/638

(58) Field of Classification Search ............ 340/426.19, 340/426.2, 531, 538.17, 539.1–539.13, 539.3, 340/568, 2, 568.4; 455/343.1–346, 556.1, 455/556.2, 557, 572, 573, 575.1; 439/626.31, 439/638; 701/213; 342/357.06, 357.1, 357.12

See application file for complete search history.

(56) References Cited

U.S. PATENT DOCUMENTS

| 5,745,579 | A |   | 4/1998 | Newman |             |
|-----------|---|---|--------|--------|-------------|
| 5,786,789 | A | * | 7/1998 | Janky  | 342/357.1   |
| 5,820,414 | A | * | 10/1998| Omori  | 439/638     |
| 6,007,372 | A | * | 12/1999| Wood   | 439/502     |
| 6,496,141 | B2| * | 12/2002| Pippin | 342/357.08  |
| 6,501,429 | B2| * | 12/2002| Nakamura et al. | 343/702 |
| 6,563,458 | B2| * | 5/2003 | Aizawa et al. | 342/357.06 |
| 6,599,147 | B1| * | 7/2003 | Mills et al. | 439/377 |
| 6,693,586 | B1| * | 2/2004 | Walters et al. | 342/357.13 |
| 6,741,934 | B2| * | 5/2004 | Chen et al. | 701/213 |
| 6,764,346 | B2| * | 7/2004 | Fujita et al. | 439/638 |
| 6,810,450 | B2| * | 10/2004| Chuang | 710/62 |
| 6,863,557 | B2| * | 3/2005 | Mills et al. | 439/377 |
| 6,909,907 | B1| * | 6/2005 | Oyang et al. | 455/556.1 |
| 6,976,111 | B1| * | 12/2005| Mills et al. | 710/301 |
| 2003/0083114 | A1| * | 5/2003 | Lavin et al. | 455/569 |

(Continued)

FOREIGN PATENT DOCUMENTS

CN 1433162 7/2003

(Continued)

*Primary Examiner*—Khoi Tran
*Assistant Examiner*—Chuong P Nguyen
(74) *Attorney, Agent, or Firm*—Lee Hong Degerman Kang & Waimey

(57) ABSTRACT

An accessory-type GPS (Global Positioning System) receiver comprises a mobile terminal side plug connector, and a cradle/hand-free side receptacle connector disposed substantially opposite thereto. The GPS receiver further comprises a power supply that receives power from a mobile terminal power charge line being operatively coupled between the mobile terminal side plug connector and the cradle/hand-free side receptacle connector. The plug connector is used to pass GPS data directly to a mobile terminal. The receptacle connector is used to pass non-GPS data to the mobile terminal via the plug connector.

20 Claims, 4 Drawing Sheets

U.S. PATENT DOCUMENTS

| | | | |
|---|---|---|---|
| 2003/0084098 A1* | 5/2003 | Lavin et al. | 709/203 |
| 2003/0132861 A1* | 7/2003 | Shieh | 340/990 |
| 2003/0154334 A1 | 8/2003 | Chuang | |

FOREIGN PATENT DOCUMENTS

| | | |
|---|---|---|
| DE | 29521017 U | 7/1996 |
| EP | 0 731 568 A2 | 9/1996 |
| JP | 07-209407 | 11/1995 |
| JP | 10-136430 | 5/1998 |
| JP | 09-229711 | 6/2000 |
| JP | 2000-512414 | 9/2000 |
| JP | 2001-153945 | 6/2001 |
| JP | 2001-280994 | 10/2001 |
| JP | 2001280994 * | 10/2001 |
| JP | 2002-062347 | 2/2002 |
| JP | 2002-123334 | 4/2002 |
| JP | 2002-218029 | 8/2002 |
| JP | 2002-320003 | 10/2002 |
| JP | 2003-114615 | 4/2003 |
| JP | 2003-229942 | 8/2003 |
| KR | 0299742 | 1/2003 |
| WO | WO 9312604 | 6/1993 |
| WO | WO 01/61875 A1 | 8/2001 |
| WO | WO 01/88917 A2 | 11/2001 |
| WO | WO 03/036923 A1 | 5/2003 |

* cited by examiner

ACCESSORY-TYPE GPS RECEIVER

CROSS-REFERENCE TO RELATED APPLICATIONS

Pursuant to 35 U.S.C. § 119(a), this application claims the benefit of earlier filing date and right of priority to Korean Patent Application No. 10-2003-0057324, filed on Aug. 19, 2003, the contents of which is hereby incorporated by reference in its entirety.

BACKGROUND OF THE INVENTION

1. Field of the Invention

The present invention relates generally to GPS receiving devices and more particularly to a mobile accessory-type GPS receiver.

2. Description of the Related Art

The GPS (Global Positioning System) comprises 24 satellites orbiting 12,000 miles above the Earth, each one making two complete rotations per day. The orbits are arranged so that at any time, anywhere on Earth, there are at least four satellites "visible" in the sky. GPS receivers are designed to locate four or more of these satellites, figure out the relative distance to each satellite, and use this information to deduce its own location.

GPS makes it possible for users equipped with ground receivers to pinpoint their own geographic location with ever-increasing accuracy. In general, the location accuracy may be anywhere from 10 to 100 meters for most run-of-the-mill GPS equipment. Accuracy may be pinpointed to within one (1) meter with military-approved equipment.

Mobile GPS receivers have presently become sufficiently low-cost and portable to attract a relatively large pool of users thus becoming common consumer products. In addition to their outdoor use, such as during hiking, cross-country skiing, ballooning, flying, and sailing, mobile GPS receivers are being used in vehicles to correlate the driver's location with traffic and weather information.

Mobile GPS receivers are generally of the cradle or accessory type. FIG. 1 generally illustrates a cradle-type GPS receiver 10 which may be used in vehicles. With this type of receiver, a GPS antenna may be affixed at an arbitrary position inside the vehicle so as to implement an optimal GPS reception environment.

FIG. 2 generally depicts an accessory-type GPS receiver 12 which may be carried around by an individual user. With this type of receiver, an active GPS antenna (not shown) is integrally coupled to the GPS receiver 12. The accessory-type GPS receiver 12 may be operatively coupled to a mobile terminal 14 via a data link cable 16. The accessory-type GPS receiver 12 may also be portable enough to be worn like a necklace or stored in a shirt pocket or the like.

In contrast, the cradle-type GPS receiver 10 cannot be carried around like an accessory-type GPS receiver. If the user desires to adapt the GPS receiver 10 for additional functionality, a new special cradle would have to be used which would add to the cost of usage.

The accessory-type GPS receiver 12, however, also carries some inherent disadvantages. For example, the data link cable 16 may not be used to power the accessory-type GPS receiver 12 and charge the battery of the mobile terminal 14 at the same time. Also, wearing the accessory-type GPS receiver 12 around one's neck or in one's shirt pocket while hand-carrying the mobile terminal 14, which is coupled to the accessory-type GPS receiver 12 may be somewhat cumbersome for some mobile GPS receiver users.

SUMMARY OF THE INVENTION

In accordance with one aspect of the present invention, an accessory-type GPS receiver comprises at least one mobile terminal side plug connector, at least one cradle/hand-free side receptacle connector, and at least one power supply receiving power from at least one mobile terminal power charge line being operatively coupled between the mobile terminal side plug connector and the cradle/hand-free side receptacle connector.

The mobile terminal side plug connector may be disposed substantially opposite the cradle/hand-free side receptacle connector. The accessory-type GPS receiver further comprises at least one GPS signal processor adapted for UART (Universal Asynchronous Receiver/Transmitter) communication with at least one mobile terminal via the mobile terminal side plug connector. The GPS signal processor receives power from the power supply. The GPS signal processor also receives power from at least one coin power cell to maintain backed-up GPS data while the GPS signal processor is in a state of "sleep".

The accessory-type GPS receiver further comprises at least one switch-type antenna portion being operatively coupled to the GPS signal processor via at least one GPS RF (Radio Frequency) filter, the switch-type antenna portion being used for wireless communication with at least one GPS satellite. The switch-type antenna portion comprises at least one internal passive GPS antenna, and at least one external active GPS antenna. When the internal passive GPS antenna is in an "on" state, the external active GPS antenna is in an "off" state, and vice versa.

Each of the mobile terminal side plug connector and the cradle/hand-free side receptacle connector may be a standard 24-pin connector, respectively.

In accordance with another aspect of the present invention, an accessory-type GPS receiver comprises at least one plug-type connector used to pass GPS data directly to at least one mobile terminal, at least one receptacle-type connector used to pass non-GPS data to the mobile terminal via the plug-type connector, and at least one power supply receiving power from at least one mobile terminal power charge line being operatively coupled between the plug-type connector and the receptacle-type connector.

The plug-type connector may be disposed substantially opposite the receptacle-type connector. The accessory-type GPS receiver further comprises at least one GPS signal processor adapted for UART communication with the mobile terminal via the plug-type connector.

The GPS signal processor receives power from the power supply. The GPS signal processor also receives power from at least one coin power cell to maintain backed-up GPS data while the GPS signal processor is in a state of "sleep".

The accessory-type GPS receiver further comprises at least one switch-type antenna portion being operatively coupled to the GPS signal processor via at least one GPS RF filter, the switch-type antenna portion being used for wireless communication with at least one GPS satellite. The switch-type antenna portion comprises at least one internal passive GPS antenna, and at least one external active GPS antenna. When the internal passive GPS antenna is in an "on" state, the external active GPS antenna is in an "off" state, and vice versa.

Each of the plug-type connector and the receptacle-type connector may be a standard 24-pin connector, respectively.

These and other aspects of the present invention will become apparent from a review of the accompanying drawings and the following detailed description of the present invention.

BRIEF DESCRIPTION OF THE DRAWINGS

The present invention is generally shown by way of reference to the accompanying drawings as follows.

DETAILED DESCRIPTION OF THE PREFERRED EMBODIMENTS

Some embodiments of the present invention will be described in detail with reference to the related drawings of FIGS. 1-6. Additional embodiments, features and/or advantages of the invention will become apparent from the ensuing description or may be learned by practicing the invention.

In the figures, the drawings are not to scale with like numerals referring to like features throughout both the drawings and the description.

The following description includes the best mode presently contemplated for carrying out the invention. This description is not to be taken in a limiting sense, but is made merely for the purpose of describing the general principles of the invention.

Figure 1:
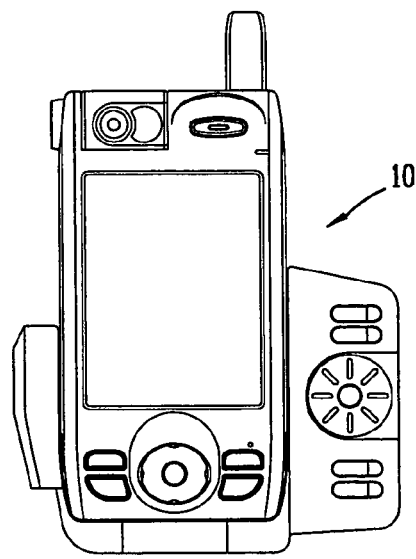
FIG. 1 schematically illustrates a conventional cradle-type GPS receiver.
Figure 2:
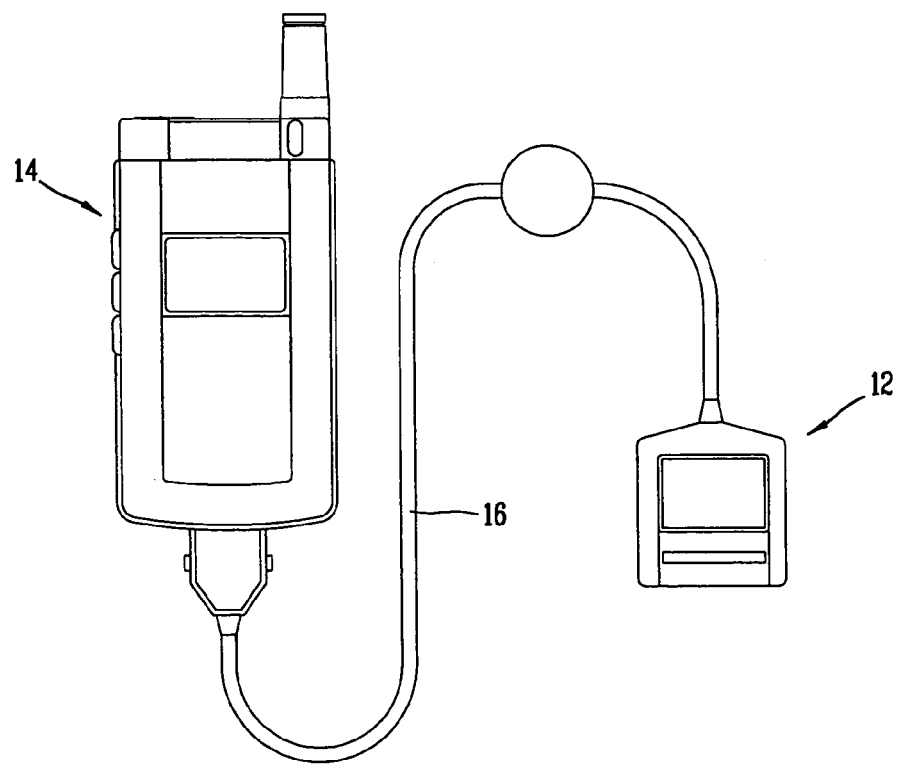
FIG. 2 schematically illustrates a conventional accessory-type GPS receiver being operatively coupled to a mobile terminal.
Figure 3A:
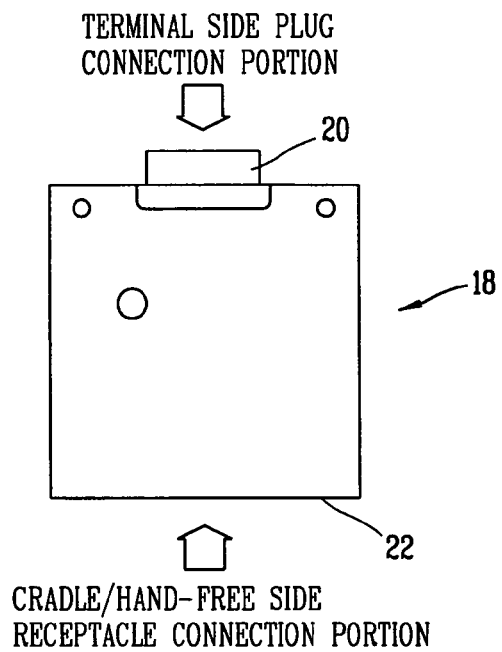
FIG. 3A is a top plan view of an accessory-type GPS receiver in accordance with the present invention.

As shown in FIG. 3A, an accessory-type GPS receiver 18 preferably includes an integral mobile terminal side plug connection portion 20 and an integral cradle/hand-free side receptacle connection portion 22 disposed substantially opposite mobile terminal plug connection portion 20. In one embodiment, accessory-type GPS receiver 18 may be configured as a portable unit approximately the size of a matchbox. Other GPS receiver configurations may be used, provided such other configurations do not depart from the intended purpose of the present invention.

Figure 3B:
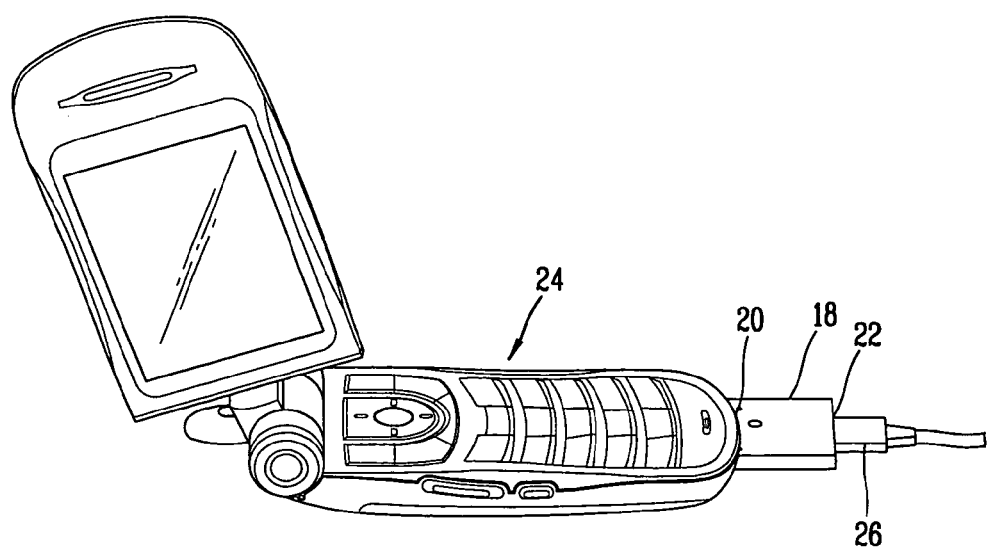
FIG. 3B schematically illustrates the accessory-type GPS receiver of FIG. 3A being used in accordance with the present invention.

As shown in FIG. 3B, the accessory-type GPS receiver 18 may be directly coupled to a mobile terminal 24 via side plug connection portion 20 (i.e. without using cable(s)), and to another device, such as a vehicle cigarette jack mobile terminal charger 26, via side receptacle connection portion 22. Mobile terminal 24 may be a cellular telephone, as generally shown in FIG. 3B, a PDA (Personal Digital Assistant), a tablet PC (Personal Computer), a laptop computer, or the like.

The accessory-type GPS receiver 18 may be operatively coupled to other devices, such as a UART (Universal Asynchronous Receiver/Transmitter) type data link cable, a USB (Universal Serial Bus) type data link cable, an external USB mobile terminal hard drive and the like, via side receptacle connection portion 22, as needed, provided such couplings do not depart from the spirit and scope of the present invention.

Figure 4:
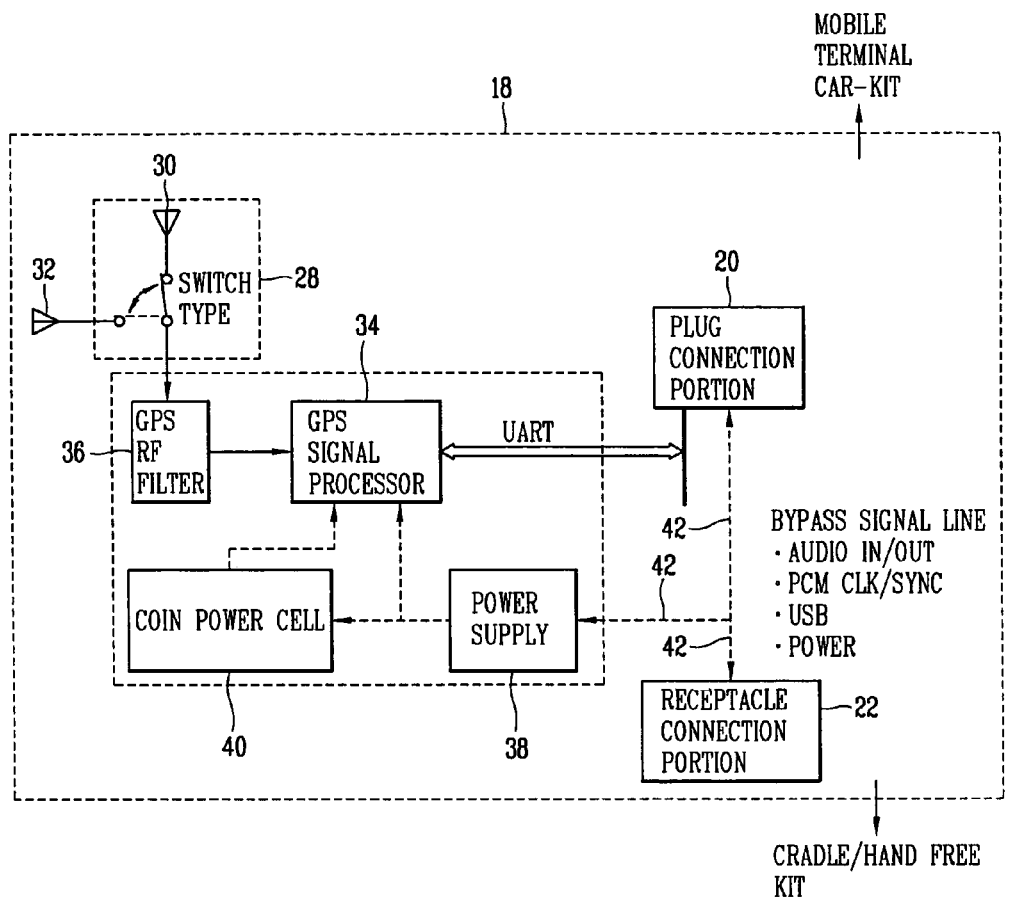
FIG. 4 schematically illustrates the architecture of an accessory-type GPS receiver in accordance with one embodiment of the present invention.
Figure 5:
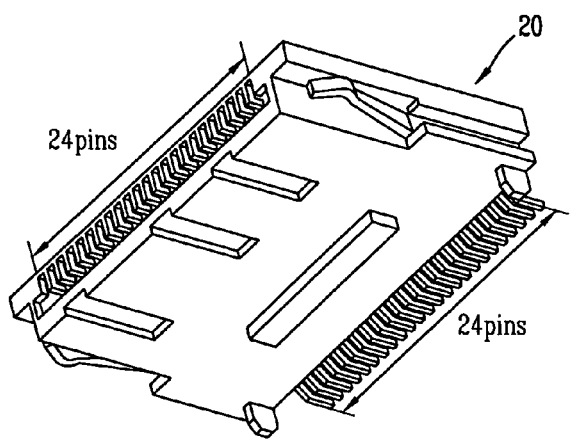
FIG. 5 is a top perspective view of a mobile terminal side plug-type connector of the accessory-type GPS receiver of FIG. 3A in accordance with one embodiment of the present invention.
Figure 6:
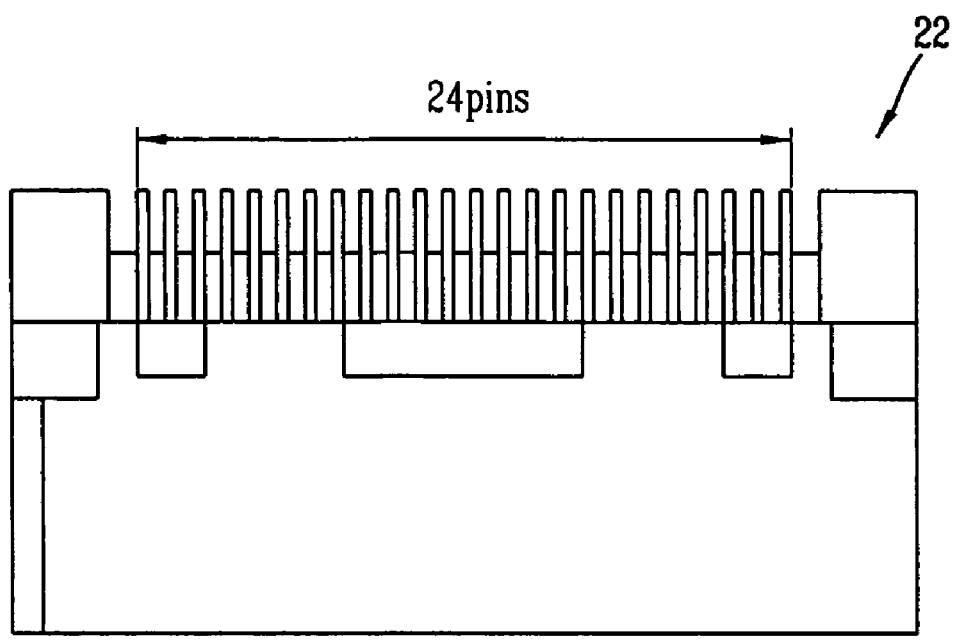
FIG. 6 is a top perspective view of a cradle/hand-free side receptacle-type connector of the accessory-type GPS receiver of FIG. 3A in accordance with another embodiment of the present invention.

As shown in FIG. 4, the accessory-type GPS receiver 18 comprises a switch-type antenna portion 28 being operatively coupled to a GPS signal processor 34 via a GPS RF (Radio Frequency) filter 36. Switch-type antenna portion 28 includes an internal chip-type passive GPS antenna 30 and an external active GPS antenna 32. Switch-type antenna portion 28 receives/transmits wireless GPS signals from/to GPS satellites. When external GPS antenna 32 is operatively connected, internal GPS antenna 30 is in an "off" state, i.e. not functioning. Similarly, when internal GPS antenna 30 is operatively connected, external GPS antenna 32 is in an "off" state, as generally shown in FIG. 4. Antenna switching is being done automatically according to GPS reception needs in real time.

GPS signal processor 34 receives wireless GPS signals from switch-type antenna portion 28 (via GPS RF filter 36) and outputs corresponding position information to a mobile terminal, such as mobile terminal 24 in FIG. 3B, according to a pre-designated data transmission protocol via a UART connection and integral mobile terminal side plug connection-portion 20, as generally illustrated in FIG. 4. GPS signal processor 34 receives power from an integral power supply 38 and a coin power cell 40. Coin power cell 40 is used to provide power for backed-up GPS data when GPS signal processor 34 is in a state of "sleep", i.e. being powered off. GPS signal processor 34 is in an operative state when being powered by power supply 38.

GPS signal processor 34 may be powered on/off via mobile terminal key input or via an integral power switch. GPS signal processor 34 may also be powered on/off via a mobile terminal power charge line 42 operatively coupled between mobile terminal side plug connection portion 20, cradle/hand-free side receptacle connection portion 22, and power supply 38, as generally illustrated in FIG. 4. Specifically, power charge line 42 feeds power into power supply 38 and mobile terminal 24 via side plug connection portion 20. This type of power sharing functionality allows GPS receiver 18 to operate continuously while the battery of mobile terminal 24 is being re-charged, provided GPS receiver 18 is operatively connected between vehicle cigarette jack mobile terminal charger 26 and mobile terminal 24, as generally depicted in FIG. 3.

As generally depicted in FIG. 4, receptacle connection portion 22 may be used to pass various non-GPS related signals to/from mobile terminal 24 via plug connection portion 20, i.e. bypassing the GPS circuitry of GPS receiver 18. Such non-GPS related signals may include, for example, audio in/out signals, PCM (Pulse Code Modulation) clk/sync signals, USB, external power signals, etc.

In accordance with one embodiment of the present invention, side plug connection portion 20 may be configured as a standard 24-pin connector (FIG. 5) adapted to mate with a corresponding data link connector on mobile terminal 24 (FIG. 3). For example, the 4th and 5th pins of 24-pin connector 20 may be designated for input of external power, while the 21st and 22nd pins may be designated for input from a 4.2 V battery charge power. Other pins may be used to pass UART position information to mobile terminal 24.

In accordance with another embodiment of the present invention, side receptacle connection portion 22 may be configured as a standard 24-pin connector (FIG. 6) adapted to mate with a corresponding connector on vehicle cigarette jack mobile terminal charger 26 (FIG. 3). For example, the 7th, 8th, 9th and 11th pins of 24-pin connector 22 may be used to pass through PCM data signals to mobile terminal 24 via side plug connection portion 20.

All terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

While the present invention has been described in detail with regards to several embodiments, it should be appreciated that various modifications and variations may be made in the present invention without departing from the scope or spirit of the invention. In this regard it is important to note that practicing the invention is not limited to the applications described hereinabove.

Many other applications and/or alterations may be utilized provided that such other applications and/or alterations do not deviate from the intended purpose of the present invention. Also, features illustrated or described as part of one embodiment can be used in another embodiment to provide yet another embodiment such that the features are not limited to the embodiments described above. Thus, it is intended that the present invention cover all such embodiments and variations as long as such embodiments and variations come within the scope of the appended claims and their equivalents.

What is claimed is:

1. A GPS (Global Positioning System) receiver, comprising:
   at least one GPS signal processor configured to process GPS signals received from one or more satellites;
   at least one mobile terminal side plug connector arranged to connect the GPS receiver to a mobile communication terminal;
   at least one cradle/hand-free side receptacle connector arranged to connect the GPS receiver to an external poxver supply that is external to both said mobile communication terminal and the GPS receiver, wherein in response to the GPS receiver being connected in between the external power supply and the mobile communication terminal, an internal power supply of the mobile communication terminal is recharged by the external power supply;
   a first internal power supply configured to power the GPS signal processor in a first state, wherein the first internal power supply does not provide power to the mobile communication terminal; and
   a second internal power supply configured to power the GPS signal processor in a second state to maintain power to a memory for storing GPS data while said at least one GPS signal processor is in the second state.

2. The GPS receiver of claim 1, wherein the at least one GPS signal processor communicates with at least one mobile terminal via said at least one mobile terminal side plug connector through a UART (Universal Asynchronous Receiver/Transmitter).

3. The GPS receiver of claim 1, wherein said at least one GPS signal processor is configured to receive power from the external power supply.

4. The GPS receiver of claim 1, wherein said second internal power supply comprises at least one coin cell power supply to maintain power to a memory configured to store GPS data while said at least one GPS signal processor is in the second state.

5. The GPS receiver of claim 1, further comprising at least one switch-type antenna portion being operatively coupled to said at least one GPS signal processor via at least one GPS RF (Radio Frequency) filter, said at least one switch-type antenna portion being used for wireless communication with at least one GPS satellite.

6. The GPS receiver of claim 5, wherein said at least one switch-type antenna portion comprises at least one internal passive GPS antenna, and at least one external active GPS antenna.

7. The GPS receiver of claim 6, wherein when said at least one internal passive GPS antenna is in an "on" state, said at least one external active GPS antenna is in an "off" state.

8. The GPS receiver of claim 6, wherein when said at least one external active GPS antenna is in an "on" state, said at least one internal passive GPS antenna is in an "off" state.

9. A GPS (Global Positioning System) receiver, comprising:
   at least one GPS signal processor configured to process GPS signals received from one or more satellites;
   at least one plug-type connector configured to pass the GPS signals directly to at least one mobile terminal;
   at least one receptacle-type connector configured to pass non-GPS signals to said at least one mobile terminal via said at least one plug-type connector; and
   wherein said cradle/hand-free side receptacle connector connects the GPS receiver to an external power supply that is external to both said mobile communication terminal and the GPS receiver, wherein in response to the GPS receiver being connected in between the external power supply and the mobile communication terminal, an internal power supply of the mobile communication terminal is recharged by the external power supply;
   a first internal power supply configured to power the GPS signal processor in a first state, wherein the first internal power supply does not provide power to the mobile communication terminal; and
   a second internal power supply configured to power the GPS signal processor in a second state to maintain power to a memory for storing GPS data while said at least one GPS signal processor is in the second state.

10. The GPS receiver of claim 9, wherein the at least one GPS signal processor communicates with at least one mobile terminal via said at least one mobile terminal side plug connector through a UART (Universal Asynchronous Receiver/Transmitter).

11. The GPS receiver of claim 10, wherein said at least one GPS signal processor is configured to receive power from said external power supply.

12. The GPS receiver of claim 9, wherein the second internal power supply comprises at least one coin cell power supply to maintain power to a memory is configured to store GPS data while said at least one GPS signal processor is in the second state.

13. The GPS receiver of claim 10, further comprising at least one switch-type antenna portion being operatively coupled to said at least one GPS signal processor via at least one GPS RF (Radio Frequency) filter, said at least one switch-type antenna portion being used for wireless communication with at least one GPS satellite.

14. The GPS receiver of claim 13, wherein said at least one switch-type antenna portion comprises at least one internal passive GPS antenna, and at least one external active GPS antenna.

15. The GPS receiver of claim 14, wherein when said at least one internal passive GPS antenna is in an "on" state, said at least one external active GPS antenna is in an "off" state.

16. The GPS receiver of claim 14, wherein when said at least one external active GPS antenna is in an "on" state, said at least one internal passive GPS antenna is in an "off" state.

17. The GPS receiver of claim 1, wherein each of said at least one mobile terminal side plug connector and said at least one cradle/hand-free side receptacle connector is a standard 24-pin connector, respectively.

18. The GPS receiver of claim 9, wherein each of said at least one plug-type connector and said at least one receptacle-type connector is a standard 24-pin connector, respectively.

19. The GPS receiver of claim 1, wherein in the first state the GPS receiver is connected to the mobile communication terminal.

20. The GPS receiver of claim 1, wherein in the second state the GPS receiver is disconnected from the mobile communication terminal.

* * * * *